United States Patent
Pfingstl et al.

(10) Patent No.: US 10,253,942 B2
(45) Date of Patent: Apr. 9, 2019

(54) LIGHTING DEVICE FOR VEHICLES

(71) Applicant: HELLA GmbH & Co. KGaA, Lippstadt (DE)

(72) Inventors: Rainer Pfingstl, Stegersbach (AT); Mario Roehrling, Bad Tatzmannsdorf (AT)

(73) Assignee: HELLA GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 15/919,342

(22) Filed: Mar. 13, 2018

(65) Prior Publication Data

US 2018/0266644 A1    Sep. 20, 2018

(30) Foreign Application Priority Data

Mar. 16, 2017 (DE) .................. 10 2017 105 633

(51) Int. Cl.
*F21S 43/31* (2018.01)
*F21S 43/14* (2018.01)
*F21S 41/33* (2018.01)

(52) U.S. Cl.
CPC ............ *F21S 43/31* (2018.01); *F21S 41/336* (2018.01); *F21S 41/337* (2018.01); *F21S 43/14* (2018.01)

(58) Field of Classification Search
CPC .................. F21S 43/31; F21S 43/14
See application file for complete search history.

(56) References Cited

U.S. PATENT DOCUMENTS

| 1,751,934 A | 3/1930 | Linton et al. |
| 3,700,883 A | 10/1972 | Donohue et al. |
| 4,704,661 A | 11/1987 | Kosmatka |
| 5,702,173 A * | 12/1997 | Kawamura .......... B60Q 1/0041 362/505 |
| 2014/0022809 A1 | 1/2014 | Hager |

FOREIGN PATENT DOCUMENTS

| DE | 102009005635 A1 | 7/2010 |
| DE | 102009035165 A1 | 3/2011 |
| DE | 102011006699 A1 | 10/2012 |
| EP | 1077344 A2 | 2/2001 |
| EP | 3106347 A1 | 12/2016 |

OTHER PUBLICATIONS

European Search Report dated Sep. 11, 2018, in European Application No. 18159375.7.

* cited by examiner

*Primary Examiner* — David V Bruce

(74) *Attorney, Agent, or Firm* — Patent Central LLC; Stephan A. Pendorf

(57) ABSTRACT

A lighting device for vehicles, having a number of light sources (6) and reflectors (7) being arranged in the housing (1). Each light source (6) is assigned a single reflector (7) in order to deflect the light emitted by the light source (6) in a main emission direction (H) of the lighting device in accordance with a predefined light distribution. The reflector (7) has a reflector surface having a basic form containing a multiplicity of panes (13, 14). The reflector (7) has a first reflector segment (10) containing a reflector surface having a first basic form in order to generate a first partial light distribution (T1) on the one hand, and a second reflector segment (11) containing a reflector surface having a second basic form in order to generate a second partial light distribution (T2) on the other hand.

9 Claims, 3 Drawing Sheets

T2

G

LIGHTING DEVICE FOR VEHICLES

The invention relates to a lighting device for vehicles, having a housing containing an opening edge which is connected by means of a sealant and/or an adhesive to a transparent lens, a number of light sources and reflectors being arranged in the housing, wherein each light source is assigned a single reflector in order to deflect the light emitted by the light source in a main emission direction of the lighting device in accordance with a predefined light distribution, wherein the reflector has a reflector surface having a basic form containing a multiplicity of panes.

A vehicle light having a multiplicity of light sources and reflectors assigned to each of the same is known from EP 1 077 344 A2. The reflectors each have a predefined basic form, wherein the basic form is formed by a multiplicity of panes arranged next to one another. The basic form of the reflector surface is parabolic. Thanks to the plurality of light sources and reflectors assigned to the same, a space-saving vehicle light can be created in order to generate a predefined light distribution. The disadvantage of the known vehicle light is that the construction is relatively elaborate. In particular, multiple light sources have to be arranged in different planes.

The object of the present invention is therefore to further develop a lighting device having a light source and a reflector in such a manner that a predefined homogeneous light distribution can be generated in a space-saving and inexpensive manner.

In order to achieve this object, the invention is characterized in conjunction with the preamble of Claim 1 in that the reflector has a first reflector segment containing a reflector surface having a first basic form in order to generate a first partial light distribution on the one hand, and a second reflector segment containing a reflector surface having a second basic form in order to generate a second partial light distribution on the other hand.

According to the invention, a reflector has multiple reflector segments which have a different basic form and, as a result of this, are provided in order to generate different partial light distributions. A first reflector segment serves to generate a first partial light distribution (near-field illumination). A second reflector segment serves to generate a second partial light distribution (far-field illumination). Superimposing these partial light distributions provides a predefined light distribution, wherein a working light distribution is preferably generated if the vehicles concerned are agricultural vehicles or agricultural machines. The reflector segments are assigned to the same light source so that the resulting light distribution can be generated with a minimum of light sources. The fact that the reflector segments responsible for different partial light distributions are integrated in a single reflector means that installation space is saved.

According to a preferred embodiment of the invention, the first basic form of the first reflector segment and the second basic form of the second reflector segment are configured in such a manner that, as a result, the reflector is able to generate near-field illumination on the one hand and to generate far-field illumination on the other hand. In particular, the near-field illumination can be generated without a lens having to have optical elements.

According to a further development of the invention, the number of the first reflector segments on the one hand, and of the second reflector segments on the other hand, is the same, wherein the first and second reflector segments are each arranged in pairs. Reflector segments of a pair of first and second reflector segments are arranged opposite with respect to the light source. As a result of this, the reflector advantageously has a relatively simple construction.

According to a further development of the invention, the first and the second reflector segment project onto a plane running perpendicularly to the main emission direction in the form of a section of a circle at an acute ring angle. A distance between marginal edges of the respective reflector segments consequently increases as the distance of the light source increases. The marginal edges are preferably configured linearly. The reflector consequently has a construction which is simple to manufacture as well as an effective deflection of the light flux provided by the light source in order to generate the light distribution.

According to a further development of the invention, the marginal edge configured between the reflector segments has a width which increases in size towards an outer edge of the reflector. This ensures that the reflector segments of a different basic form can be manufactured in a single piece.

The lighting device according to the invention is preferably used as a working headlight in agricultural vehicles and/or agricultural machines. In order to generate the light distributions, multiple light modules are preferably arranged next to one another, wherein each light module is formed by a single light source and a single reflector. The light sources of the light modules can be arranged in a joint plane on a single light source carrier. This produces space-saving and effective homogeneous illumination by means of the working headlight.

One embodiment example of the invention will be explained in greater detail below, with reference to the drawings, wherein.

Figure 1:
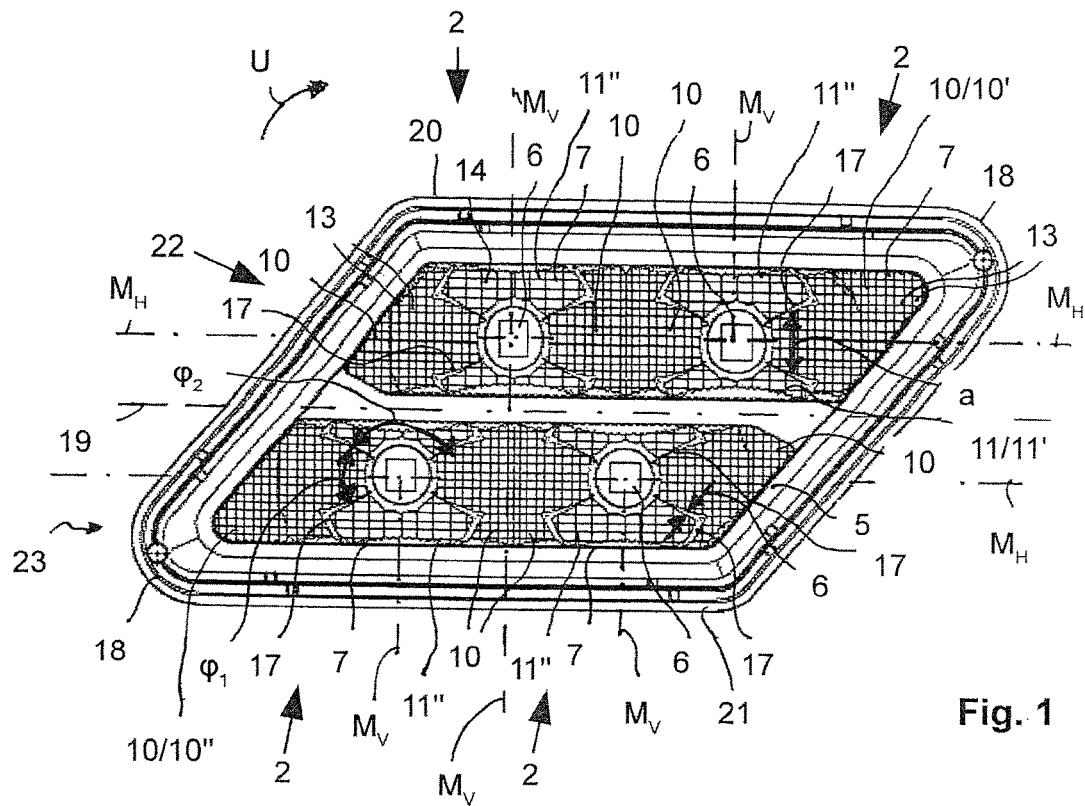
FIG. 1 shows a front view of a lighting device.

A lighting device according to the invention is preferably used as a working headlight in agricultural vehicles and/or agricultural machines. Alternatively, the lighting device can also be used for general lighting (buildings, public space, etc.) or in or on any vehicles. For example, the lighting device can also be used in order to generate two different light functions, for example low beam and high beam.

The lighting device has a housing 1, in which multiple light modules 2 are arranged. An opening edge 3 of the housing 1 is connected by means of sealant and/or adhesive 4 to a transparent lens 5. The sealant and/or adhesive 4 can be configured as silicone adhesive. The lens 5 is manufactured from a glass-clear plastic material or a glass-clear glass material.

The light modules 2 each have a light source 6, to which a single reflector 7 is assigned. The light source 6 is preferably configured as a semiconductor-based light source, an LED light source. A main axis 8 of the light source 6 runs parallel to a main emission direction H of the lighting device. The light source 6 is arranged in a rear opening 9 of the reflector 7. The light source 6 is consequently arranged in a base region of the reflector 7, which base region opens in the main emission direction H, forming multiple reflector segments 10, 11 up to a front edge 12 of the reflector 7. In the present embodiment example, the reflector 7 has a pair of first reflector segments 10 in order to generate a first partial light distribution T1 and a pair of second reflector segments 11 in order to generate a second partial light distribution T2. The first reflector segment 10 has a first basic form which differs from a second basic form of the second reflector segment 11. The basic form of the first reflector segment 10 is configured to be parabolic so that the first partial light distribution T1 serves to illuminate the near field. The basic form of the second reflector segment 11 is configured with a freeform surface so that the second partial light distribution T2 serves to illuminate the far field. Alternatively, the basic form of the first reflector segment 10 and/or the basic form of the second reflector segment 11 can also have another basic form; for example, the basic form of the first reflector segment 10 can have a freeform surface and the basic form of the second reflector segment 11 can be parabolic. The LED light sources 6 are each arranged on a joint light source carrier 26 (printed circuit board).

The pair of first reflector segments 10 and the pair of second reflector segments 11 together form an integrally interconnected reflector surface of the reflector 7.

The first reflector segment 10 has a multiplicity of panes 13 which are arranged next to one another, which, in their dimension, are configured to be smaller than a plurality of panes 14 arranged next to one another of the second reflector segment 11.

As can be seen from FIG. 1, the first reflector segments 10 of the pair of first reflector segments 10 on the one hand, and the second reflector segments 11 of the pair of second reflector segments 11 on the other hand are arranged on opposite sides of the light source 6. The number of the pairs of first reflector segments 10 and second reflector segments 11 is the same. In the present embodiment example, the light modules 2 each have a single pair of first reflector segments 10 and a single pair of second reflector segments 11. If necessary, two pairs of first reflector segments 10 and two pairs of second reflector segments 11 could also be provided.

The first reflector segments 10 and the second reflector segments 11 each extend in the form of an arc, and indeed in accordance with the respective basic form, from the plane in which the light sources 6 are arranged in the direction of the lens 5. The first reflector segment 10 and the second reflector segment 11 project onto a plane running perpendicularly to the main emission direction H, which preferably runs parallel to the light source carrier 26 or respectively an extension plane of the light sources 6, in each case in the form of a section of a circle at an acute ring angle $\varphi_1$ or respectively $\varphi_2$, wherein the ring angles $\varphi_1$, $\varphi_2$ run in the circumferential direction U of the reflector 7. In the present embodiment example, the ring angle $\varphi_1$ of the first reflector segment 10 is smaller than the ring angle $\varphi_2$ of the second reflector segment 11. The ring angle $\varphi_1$ of the first reflector segment 10 is in the range of 60°, while the ring angle $\varphi_2$ of the second reflector segment is in the range of 70°.

The pair of first reflector segments 10 is arranged symmetrically to a vertical central plane $M_V$ of the reflector 7. The pair of second reflector segments 11 is arranged symmetrically to a horizontal central plane $M_H$ of the reflector 7. In the circumferential direction U of the reflector 7, the first reflector segments 10 and the second reflector segments 11 are consequently arranged in turn or respectively in an alternating manner.

Figure 2:
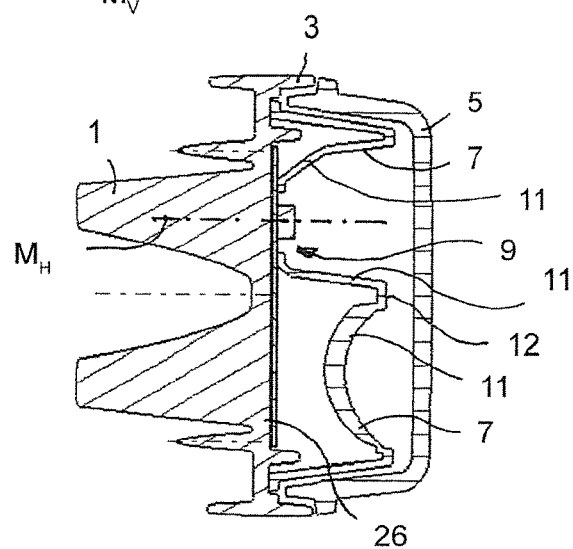
FIG. 2 shows a vertical cross-section through the lighting device.
Figure 3:
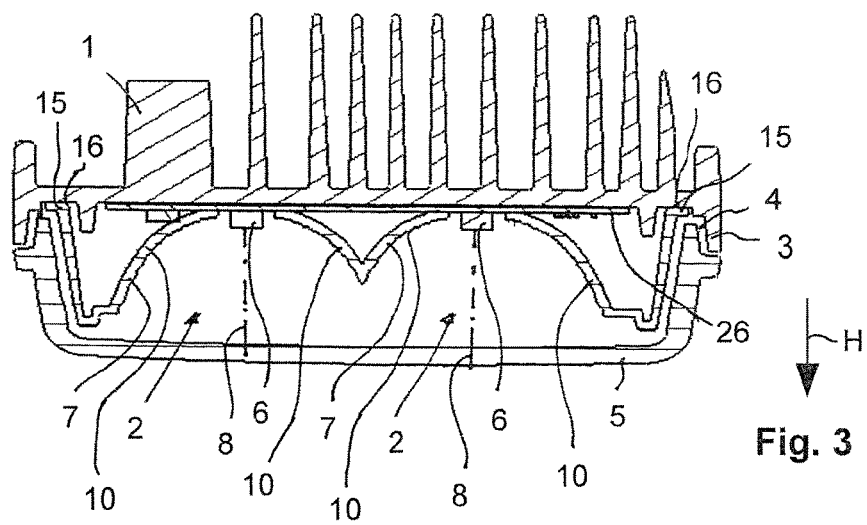
FIG. 3 shows a horizontal cross-section through the lighting device.

As can be seen from FIGS. 2 and 3, the reflectors 7 of the light modules 2 are integrally interconnected. In order to assemble the lighting device, the total reflector formed from the multiple reflectors 7 simply has to be positioned and/or affixed with its lateral feet 15 on(to) contact surfaces 16 of the housing 1.

The first reflector segments 10 and the second reflector segments 11 are each delimited by marginal edges 17, which run linearly outwards and project onto a plane running perpendicularly to the main emission direction H. The marginal edge 17 forms a connecting portion between neighboring reflector segments 10, 11. In the present embodiment example, a width b of this marginal edge 17 is configured increased in size in the direction of the front edge 12 of the reflector 7. If necessary, the width b of the marginal edge 17 or respectively of the connecting region can also be configured constant in the direction of the front edge 12 of the reflector 7.

The fact that all of the imaginary extensions of the marginal edge 17 intersect an optical axis of the light source 6 assigned to the reflector 7 means that a distance a of the marginal edges 17 delimiting respective reflector segments 10, 11 with respect to one another increases in size, from an end facing the light source 6 towards the front edge 12 of the reflector 7. The reflector 7 continually surrounds the light source 6 in the circumferential direction U.

Due to the parallelogram-shaped contour of the lens 5 or of the opening edge 3 of the housing 1, at least the reflector surfaces of the first reflector segments 10 are not configured to be the same size. This is because corner regions 18 of the housing 1 or of the lens 5 are fully utilized by the reflector segments 10, 11 in order to reflect the light. For example, the surface of the first reflector segment 10' is larger than the surface of the opposite first reflector segment 10 of the same reflector 7. To ensure that the same size reflector surface is provided on opposite sides of the light source 6, a reflector surface of the first reflector segment 10" arranged in an opposite corner region 18 is configured to be the same size as the reflector surface of the first reflector segment 10'. In this way, the size of the reflector surface of the first reflector segments 10 arranged on the one side of the light source 6 is the same size as the reflector surface of the first reflector segments 10 of the light modules 2 arranged on the opposite side. The same applies to the second reflector segments 11 if, for example, the distance of the light sources 6 from a horizontal central plane 19 of the housing is smaller than from an upper edge 20 of the housing 1 or lower edge 21 of the housing 1. In such a case, lower second reflector segments 11' of an upper row 22 of light modules 2 and upper second reflector segments 11' of a lower row 23 of light modules 2 are configured, on the one hand, to be of similar size and, on the other hand, smaller than upper second reflector segments 11" of the upper row 22 of the light modules 2 and lower reflector segments 11" of the lower row 23 of the light modules 2.

It is consequently ensured, even with asymmetrically arranged light modules 2, that the total area of the first reflector segments 10 and second reflector segments 11, which are respectively arranged in pairs, is the same.

Figure 4:
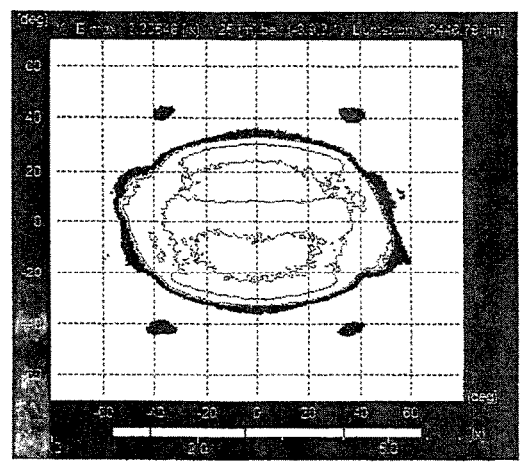
FIG. 4 shows a partial light distribution of near illumination.
Figure 5:
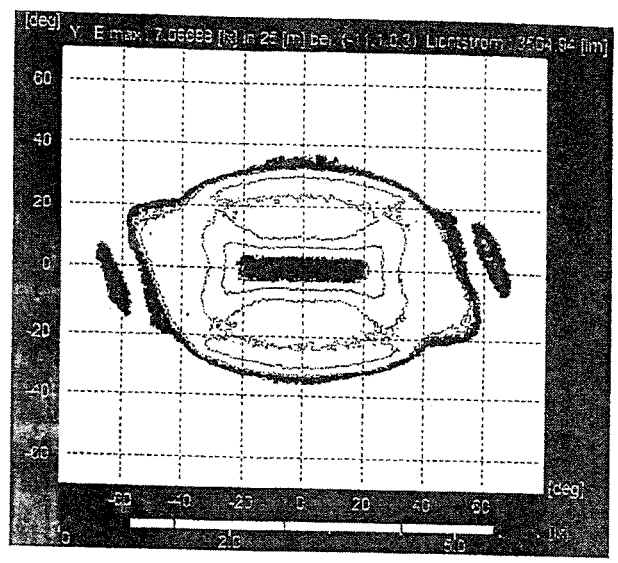
FIG. 5 shows a partial light distribution of far illumination.
Figure 6:
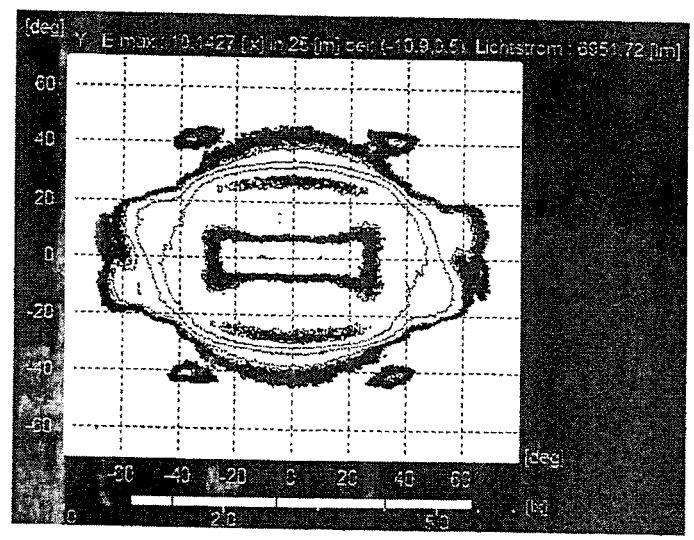
FIG. 6 shows a representation of a resulting light distribution.

The first reflector segments 10 of the light modules 2 serve to generate the first partial light distribution T1 (near-field illumination), which is shown in FIG. 4. The second reflector segments 11 of the light modules 2 generate a second partial light distribution T2 (far-field illumination) according to FIG. 5. Superimposing these two partial light distributions T1, T2 produces the total light distribution G shown in FIG. 6 which represents the light distribution of the working headlight.

The invention claimed is:

1. A lighting device for vehicles, having
a housing (1) containing an opening edge (3) which is connected by means of a sealant and/or an adhesive (4) to a transparent lens (5),
a number of light sources (6) and reflectors (7) being arranged in the housing (1),
wherein each light source (6) is assigned a single reflector (7) in order to deflect the light emitted by the light source (6) in a main emission direction (H) of the lighting device in accordance with a predefined light distribution,
wherein the reflector (7) has a reflector surface having a basic form containing a multiplicity of panes (13, 14),
wherein the reflector (7) has a first reflector segment (10) containing a reflector surface having a first basic form in order to generate a first partial light distribution (T1) on the one hand, and a second reflector segment (11) containing a reflector surface having a second basic form in order to generate a second partial light distribution (T2) on the other hand, and
wherein the first basic form of the first reflector segment (10) is configured to generate the first partial light distribution (T1) which is configured as near-field illumination and the second basic form of the second reflector segment (11) is configured to generate the second partial light distribution (T2) which is configured as far-field illumination.

2. The lighting device according to claim 1, wherein the panes (13) of the first reflector segment (10) have a smaller dimension than the panes (14) of the second reflector segment (11).

3. The lighting device according to claim 1, wherein a pair of first reflector segments (10) are arranged symmetrically to a vertical central plane ($M_V$) of the reflector (7) and a pair of second reflector segments (11) are arranged symmetrically to a horizontal central plane ($M_H$) of the reflector (7).

4. The lighting device according to claim 1, wherein the first reflector segments (10) and the second reflector segments (11) are arranged in an alternating manner in the circumferential direction (U) of the reflector (7).

5. The lighting device according to claim 1, wherein between the first reflector segment (10) and the second reflector segment (11) there is configured a marginal edge (17), the width (b) of which increases in size or is constant towards a front edge (12) of the reflector (7).

6. The lighting device according to claim 1, wherein the lens (5) is configured to be glass-clear and free of optical elements.

7. A lighting device for vehicles, having
a housing (1) containing an opening edge (3) which is connected by means of a sealant and/or an adhesive (4) to a transparent lens (5),
a number of light sources (6) and reflectors (7) being arranged in the housing (1),
wherein each light source (6) is assigned a single reflector (7) in order to deflect the light emitted by the light source (6) in a main emission direction (H) of the lighting device in accordance with a predefined light distribution,
wherein the reflector (7) has a reflector surface having a basic form containing a multiplicity of panes (13, 14),
wherein the reflector (7) has a first reflector segment (10) containing a reflector surface having a first basic form in order to generate a first partial light distribution (T1) on the one hand, and a second reflector segment (11) containing a reflector surface having a second basic form in order to generate a second partial light distribution (T2) on the other hand, and
wherein the reflector (7) has at least two first reflector segments (10) and at least two second reflector segments (11), wherein the number of the first reflector segments (10) and the second reflector segments (11) is the same and wherein the first reflector segments (10) and the second reflector segments (11) each extend in pairs from opposite sides of the light source (6) in the form of an arc in the direction of the lens (5).

8. A lighting device for vehicles, having
a housing (1) containing an opening edge (3) which is connected by means of a sealant and/or an adhesive (4) to a transparent lens (5),
a number of light sources (6) and reflectors (7) being arranged in the housing (1),
wherein each light source (6) is assigned a single reflector (7) in order to deflect the light emitted by the light source (6) in a main emission direction (H) of the lighting device in accordance with a predefined light distribution,
wherein the reflector (7) has a reflector surface having a basic form containing a multiplicity of panes (13, 14),
wherein the reflector (7) has a first reflector segment (10) containing a reflector surface having a first basic form in order to generate a first partial light distribution (T1) on the one hand, and a second reflector segment (11) containing a reflector surface having a second basic form in order to generate a second partial light distribution (T2) on the other hand, and
wherein the first reflector segment (10) and the second reflector segment (11) are projected onto a plane running perpendicularly to the main emission direction (H) in the form of a section of a circle at an acute ring angle ($\varphi_1$, $\varphi_2$).

9. The lighting device according to claim 8, wherein the ring angle ($\varphi_1$) of the first reflector segment (10) is smaller than the ring angle ($\varphi_1$) of the second reflector segment (11).

* * * * *